US012610279B2

(12) United States Patent
Tomic

(10) Patent No.: US 12,610,279 B2
(45) Date of Patent: Apr. 21, 2026

(54) SYSTEM AND METHOD FOR DETERMINING USER THROUGHPUT IN A CELLULAR NETWORK

(71) Applicant: Aspire Technology Limited, Dublin (IE)

(72) Inventor: Igor Tomic, Dublin (IE)

(73) Assignee: Aspire Technology Limited, Sandyford (IE)

( * ) Notice: Subject to any disclaimer, the term of this patent is extended or adjusted under 35 U.S.C. 154(b) by 579 days.

(21) Appl. No.: 18/017,672

(22) PCT Filed: Jul. 26, 2021

(86) PCT No.: PCT/EP2021/070902

§ 371 (c)(1),
(2) Date: Jul. 5, 2023

(87) PCT Pub. No.: WO2022/018304

PCT Pub. Date: Jan. 27, 2022

(65) Prior Publication Data

US 2023/0300676 A1    Sep. 21, 2023

(30) Foreign Application Priority Data

Jul. 24, 2020    (EP) ..................................... 20187588

(51) Int. Cl.
*H04W 28/08* (2023.01)
*H04W 28/02* (2009.01)
*H04W 72/542* (2023.01)

(52) U.S. Cl.
CPC ... *H04W 28/0942* (2020.05); *H04W 28/0236* (2013.01); *H04W 72/542* (2023.01)

(58) Field of Classification Search
CPC ......... H04W 28/0236; H04W 28/0942; H04W 72/542
See application file for complete search history.

(56) References Cited

U.S. PATENT DOCUMENTS 9,674,861 B1 *   6/2017  Pawar ................. H04W 72/569
9,961,487 B1 *   5/2018  Miao ..................... H04W 4/029
(Continued)

FOREIGN PATENT DOCUMENTS

WO        2019203704 A1    10/2019

OTHER PUBLICATIONS

PCT/EP2021/070902 International Search Report & Written Opinion (Oct. 26, 2021). 18 pages.

*Primary Examiner* — Melanie Jagannathan
(74) *Attorney, Agent, or Firm* — Anthony Smyth; LOZA & LOZA, LLP

(57)        ABSTRACT

The present invention relates to a system and method for determining user throughput in a cell sector of a cellular network. The method includes estimating a number of physical resource blocks (PRBs) available for a user in the cell sector at a given frequency, estimating data throughput per PRB in the cell sector at the given frequency, wherein data throughput per PRB in the cell sector includes a plurality of PRB values across a plurality of parts of the cell sector respectively, estimating a product of the number of PRBs and data throughput per PRB in the cell sector at the given frequency, to generate user throughput data at the given frequency in the plurality of parts of the cell sector, and summing a plurality of user throughput data computed at corresponding plurality of frequencies to generate an overall user throughput in the plurality of parts of the cell sector.

16 Claims, 4 Drawing Sheets

(56) References Cited

U.S. PATENT DOCUMENTS

| | | | | |
|---|---|---|---|---|
| 10,292,137 | B1 * | 5/2019 | Zappaterra | H04B 17/318 |
| 2014/0355540 | A1 * | 12/2014 | Accongiagioco | H04W 72/54 |
| | | | | 370/329 |
| 2015/0141024 | A1 * | 5/2015 | Kapnadak | H04W 16/18 |
| | | | | 455/446 |
| 2016/0261516 | A1 | 9/2016 | Gopinathan et al. | |
| 2016/0309476 | A1 | 10/2016 | Madan et al. | |
| 2016/0330099 | A1 | 11/2016 | Koo et al. | |
| 2017/0230293 | A1 * | 8/2017 | Meredith | H04L 43/062 |
| 2017/0303180 | A1 * | 10/2017 | Kapoulas | H04W 36/08 |
| 2018/0020358 | A1 * | 1/2018 | Breuer | H04W 16/14 |
| 2019/0280845 | A1 * | 9/2019 | Bedekar | H04L 5/0098 |
| 2020/0187093 | A1 * | 6/2020 | Awad | H04W 72/30 |
| 2021/0083980 | A1 * | 3/2021 | Van Den Brink | H04L 43/0894 |
| 2022/0030463 | A1 * | 1/2022 | Rushton | H04W 28/082 |
| 2023/0038198 | A1 * | 2/2023 | Lewis | H04L 41/5019 |
| 2023/0421429 | A1 * | 12/2023 | Kancharla | H04L 43/065 |

* cited by examiner

300

400

SYSTEM AND METHOD FOR DETERMINING USER THROUGHPUT IN A CELLULAR NETWORK

CLAIM OF PRIORITY

This application is the U.S. National Stage of International Patent Application No. PCT/EP2021/070902 filed 26 Jul. 2021, which claims priority to European Patent Application No. EP 20187588.7 filed 24 Jul. 2020, both of which applications are incorporated herein by reference in their entirety.

FIELD

The present disclosure relates to a system and method for determining user throughput in a cellular network and more particularly to a system and method for analysing user experience of a cellular network based on user throughput in different parts, i.e. from close to antenna to cell edge, of at least one cell constituting a cellular network.

BACKGROUND

Optimizing user experience remains one of the topmost priorities for cellular network service providers. Poor performance and inefficiency often result from congestion, inadequate coverage and the like. Networks such as 4G/Long Term Evolution (LTE) networks are known to use older pre-existing techniques to optimize user experience.

The known performance management related portfolio of processes, tools or solutions for LTE systems typically do not provide ability to engineers working on design and optimization to observe user experienced data throughput in different parts of a cell, and especially in most critical parts of a cell such as parts closer to cell edge, where ability of system to meet target requirements from different applications is most challenged. At the same time, there is a great need to understand performance on cell edge, as the main focus of network design is to secure acceptable performance for the most challenging radio environment.

Performance management systems available for existing Radio Access Networks (RAN) have numerous other drawbacks. One of the main limitations is that such systems are typically placed in base stations and can report mainly average performance.

Another limitation of network performance management systems known in the art is that they are not capable of determining traffic contributing payload. Also, bursty, chatty type of traffic is not capable to utilize full network potential in terms of providing user throughput, because of insufficient data in scheduler buffer to be sent over minimum period of transmission time. However, this is reflected in standard Performance management (PM) throughput measurements as pessimistic user throughput values, where outcome observed cell by cell is very much driven with offered traffic mix and ratio between heavy and light users in cell of observation, rather than real network capability to provide user experience.

Further, in carrier aggregation scenarios, throughput counters do not provide accurate information since the higher layers in protocol stack, like typical Packet Data Conversion Protocol or Radio Linc Control, where throughput counters are collected, are not capable of ascertaining whether traffic originates from primary or secondary cells. US 2020128441 relates to a system that include a network analysis platform that applies performance models to determine if a load imbalance exists at a cell, such as at a base station. The performance models are pre-trained based on network telemetry data. For a session at a cell, an expected load can be compared to an actual load to determine whether the session is impacted by a load imbalance. However, said patent application focus on traffic de-balance and offloading congested cells, and does not focus on determining user throughput and understanding user experience in different parts of the cellular network, and accordingly capacity planning based on the user experience.

There is therefore a need for a more efficient and accurate solution for analysing user experience of a cellular network, not just as-is, but also with an ability to predict future network performance, especially considering rapid traffic growth from one side and typical time in industry needed to deploy new capacity with yearly investment lifecycle, and this forms the primary objective of the present invention.

SUMMARY

The present invention relates to a system and method for determining user throughput in a cellular network, as set out in the appended claims.

In one embodiment, there is provided a method for determining user throughput in a cell sector of a cellular network, the method comprising the steps of estimating a number of physical resource blocks (PRBs) available for a user in the cell sector at a given frequency, estimating data throughput per PRB in the cell sector at the given frequency, wherein data throughput per PRB in the cell sector includes a plurality of throughput per PRB values across a plurality of parts of the cell sector respectively, estimating a product of the number of PRBs and data throughput per PRB in the cell sector at the given frequency, to generate user throughput data at the given frequency in the plurality of parts of the cell sector, and summing a plurality of user throughput data computed at corresponding plurality of frequencies to generate an overall user throughput in the plurality of parts of the cell sector.

In an embodiment of the present invention, the method further includes creating a graphical illustration of the overall user throughput in the cell sector to indicate user experience in different parts of the cell sector.

In an embodiment of the present invention, the number of PRBs available for the user is estimated based on available PRB sources at the given frequency and a number of active users in the cell sector, wherein the number of active users includes a sum of measured number of active users in one or more frequency layers of the cell sector.

In an embodiment of the present invention, the available PRB resources at the given frequency are determined based on a deployed bandwidth, and Physical Download Control Channel (PDCCH) configuration of the cellular network, and information about PRBs consumed by Voice over Lte (VoLte)s and Internet of things (IoT).

In an embodiment of the present invention, the data throughput per PRB in the cell sector is estimated based on radio quality and link adaptation measurements per cell sector and expected traffic increase.

In an embodiment of the present invention, the radio quality and link adaptation measurements are determined based on Channel Quality Indicator (CQI) distribution, and Multiple Input Multiple Output (MIMO) utilization and modulation distribution in the cell sector.

In an embodiment of the present invention, the cellular network is a Long Term Evolution (LTE) network or 5G-NR network.

In an embodiment of the present invention, the data throughput per PRB is estimated in different parts of the cell sector at the given frequency for current network load and predicted future network load, where prediction is based on estimation of CQI and MIMO utilization degradation with traffic and network load growth, with combination of supervised and unsupervised learning on data sets collected from past.

In an embodiment of the present invention, the plurality of PRB values across the plurality of parts of the sector is estimated through analysis of probability distribution function of reported CQI distribution in the cell sector.

In an embodiment of the present invention, the plurality of parts of the cell sector includes a base station of the cell sector, an edge of the cell sector, a mid-point between the base station and the edge.

In an embodiment of the present invention, the number of PRBs available for the user is estimated by dividing an available number of PRBs by the number of active users increased by one.

In an embodiment of the present invention, the method further comprises grouping the plurality of throughput per PRB values based on a set of percentile values, and generating a graph of the plurality of throughput per PRB values against the set of percentile values, wherein the throughput per PRB values with minimum percentile value are estimated nearest to the base station of the cell sector, and the throughput per PRB values with maximum percentile value are estimated farthest from the base station of the cell sector.

In another embodiment, there is provided a system for determining user throughput in a cell sector of a cellular network. The system includes a monitoring module for estimating a number of physical resource blocks (PRBs) available for a user in the cell sector at a given frequency, a network monitoring module for estimating data throughput per PRB in the cell sector at the given frequency, wherein data throughput per PRB in the cell sector includes a plurality of PRB values across a plurality of parts of the cell sector respectively, and a computing module for estimating a product of the number of PRBs and data throughput per PRB in the cell sector at the given frequency, to generate user throughput data at the given frequency in the plurality of parts of the cell sector, and summing a plurality of user throughput data computed at corresponding plurality of frequencies to generate an overall user throughput in the plurality of parts of the cell sector.

In an embodiment of the present invention, the system further includes a graphic illustration module for creating a graphical illustration of the overall user throughput in the cell sector to indicate user experience in different parts of the cell sector.

In an embodiment of the present invention, the number of PRBs available for the user is estimated based on available PRB sources at the given frequency and a number of active users in the cell sector, wherein the number of active users includes a sum of measured number of active users in one or more frequency layers of the cell sector.

In an embodiment of the present invention, the available PRB resources at the given frequency are determined based on a deployed bandwidth, and Physical Download Control Channel (PDCCH) configuration of the cellular network, and information about PRBs consumed by Voice over Lte (VoLte)s and Internet of things (IoT).

In an embodiment of the present invention, data throughput per PRB in the cell sector is estimated based on radio quality and link adaptation measurements per cell sector, and expected traffic increase.

In an embodiment of the present invention, the radio quality and link adaptation measurements include Channel Quality Indicator (CQI) distribution, and Multiple Input Multiple Output (MIMO) utilization and modulation distribution in the cell sector.

In an embodiment of the present invention, data throughput per PRB is estimated in different parts of the cell sector at the given frequency for current network load and predicted future network load, where prediction is based on estimation of CQI and MIMO utilization degradation with traffic and network load growth, with combination of supervised and unsupervised learning on data sets collected from past.

In yet another embodiment, there is provided a non-transitory computer readable medium having stored thereon computer-executable instructions which, when executed by a processor, cause the processor to estimate a number of physical resource blocks (PRBs) available for a user in the cell sector at a given frequency, estimate data throughput per PRB in the cell sector at the given frequency, wherein data throughput per PRB in the cell sector includes a plurality of PRB values across a plurality of parts of the cell sector respectively, estimate a product of the number of PRBs and data throughput per PRB in the cell sector at the given frequency, to generate user throughput data at the given frequency in the plurality of parts of the cell sector, and sum a plurality of user throughput data computed at corresponding plurality of frequencies to generate an overall user throughput in the plurality of parts of the cell sector.

In yet another embodiment, there is provided a method comprising the steps of selecting at least one cell from a plurality of cells constituting the cellular network, estimating the number of physical resource blocks available for a new user in each selected cell and estimating the throughput for each estimated physical resource block. Further, the user throughput is computed which is calculated as the product of the number of physical resource blocks available and the throughput for each physical resource block, and thereafter graphical models of the computed user throughput is created.

The disclosed invention enables modelling of user experience in terms of data throughput from different parts of the cell. Further, decoupling of user throughput to two components and analysis on cell level, enables accurate insights on throughout performance including carrier aggregation performance, as well as prediction of performance evolution in growing traffic and network load conditions. In one embodiment there is provided a monitoring system for estimating number of physical resource blocks available for a user in each cell, network monitoring equipment for estimating data throughput for each estimated physical resource block and a computing unit for calculating the user throughput.

In one embodiment the number of physical resource blocks for a new user in each selected cell is estimated based on parameters such as the deployed bandwidth and the number of active users of the selected cell, and the throughput for each physical resource block is further estimated based on parameters including the Channel Quality Indicator (CQI) and Multiple Input Multiple Output (MIMO) utilization that are considered separately for different layers and related frequencies deployed in each selected cell.

Various embodiments of the present invention provide a system and method that predicts future performance, depending on traffic and network load growth, with currently deployed capacity or with added additional LTE layers, enabling smart capacity expansion planning, that will maximize user experience and return on investments through selection of best capacity expansion options that meets target performance.

There is also provided a computer program comprising program instructions for causing a computer program to carry out the above method which may be embodied on a record medium, carrier signal or read-only memory.

BRIEF DESCRIPTION OF DRAWINGS

The novel features of the present invention are set forth in the appended claims hereto. The subject matter itself, however, as well as a preferred mode of use, further objectives; and advantages thereof, will best be understood by reference to the following detailed description of illustrative embodiments when read in conjunction with the accompanying drawings and wherein:

DETAILED DESCRIPTION OF INVENTION

Figure 1:
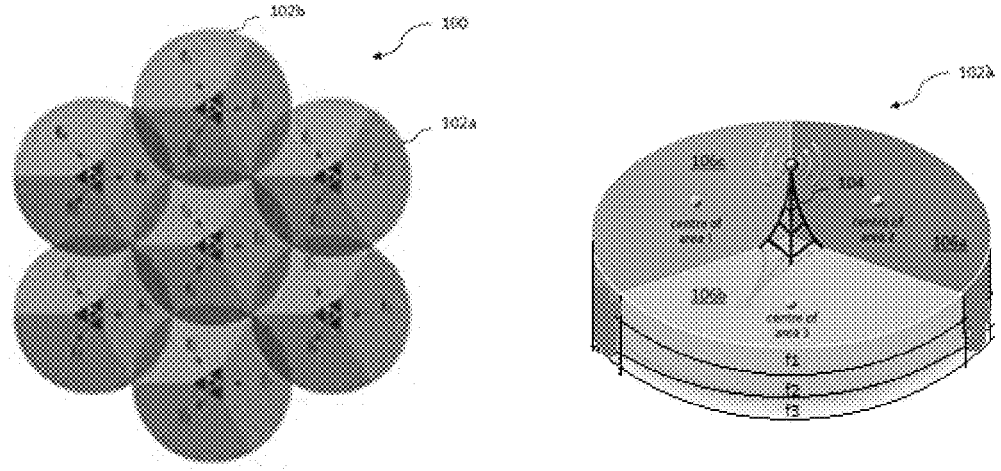
FIG. 1 illustrates an environment, wherein various embodiments of the present invention can be practiced.

FIG. 1 illustrates an environment 100, wherein various embodiments of the present invention can be practiced.

The environment 100 pertains to a cellular network 100, which is formed of a plurality of cells such as cells 102*a* and 102*b*. In a preferred embodiment of the present invention, the cellular network is a Long-Term Evolution (LTE) or 5G-NR network. Each of the cells 102*a* and 102*b* is a geographical area covered by the frequency emitted by corresponding base station in the cellular network 100.

In the context of the present invention, each of the cells 102*a* and 102*b* includes a base station and is partitioned into three cell sectors. A cell sector means a geographic area defined by a carrier's own radio frequency coverage data. For example, the cell 102*a* includes a base station 104 and first, second and third cell sectors 106*a*, 106*b* and 106*c*. A single cell sector may be shared by multiple cells operating on different frequencies. Although, the cells 102*a* and 102*b* are shown to be of circular shape, very often they are presented in modelling as hexagonal shape, while in practice they are mainly of irregular shape.

In the cell 102*a*, the base station 104 may transmit signals of different frequencies—in particular example: first, second and third frequencies in the first, second and third cell sectors 106*a*, 106*b* and 106*c*. In each cell sector, a number of active users may be determined based on the number of user equipment (UE) transmitting and receiving signals to and from the base station 104.

Also, in a cell sector, such as the first cell sector 106*a*, the user throughput may vary based on the location of the user in the first cell sector 106*a*. The user throughput may be measured in MBPS. Typically, the user throughput may be highest when it is near to the base station 104, and it reduces as it moves away from the base station 104, for example, when the user reaches an edge of the first cell sector 106*a*, i.e., a boundary of the first cell sector 106. However, the throughput of the user in the first cell sector 106*a* may also be dependent based on the distance from the base station of other cells sharing the first cell sector 106*a*. In the context of the present invention, cell sector is alternatively referred to as cell, sector, and vice versa.

Figure 2:
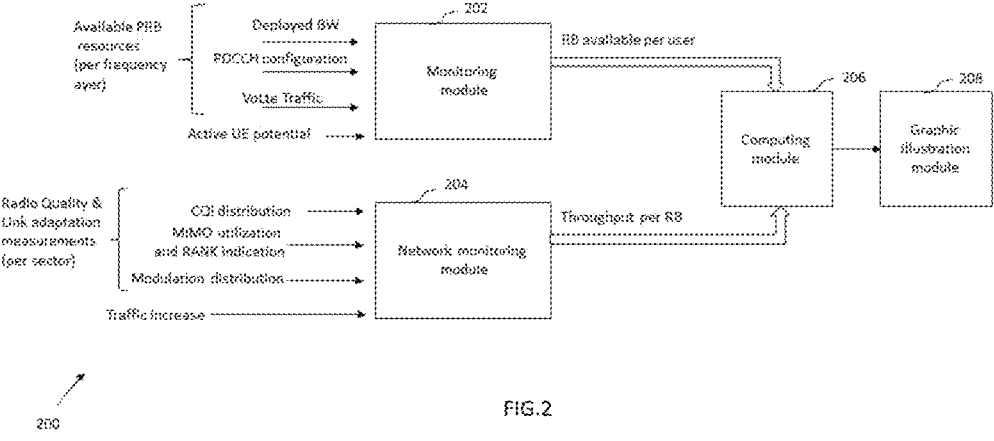
FIG. 2 illustrates a system for determining user throughput in a cell sector of the cellular network of FIG. 1.

FIG. 2 illustrates a system 200 for analyzing user experience in the cellular network 100, in accordance with an embodiment of the present invention. For the sake of brevity, the system 200 has been explained for analysing user experience in one cell sector of the cellular network 100. However, it would be apparent to one of ordinary skill in the art, that the system 200 may be used for analyzing user experience for each cell sector of the cellular network 100 in the similar manner.

The system 200 may include a selection module (not shown) for selecting a cell sector, and further includes a monitoring module 202 for estimating a number of physical resource blocks (PRBs) available for a new user in the selected cell sector for a given frequency layer. An example of the selected cell sector is the first cell sector 106*a* which may be shared by multiple cells and multiple frequency layers in the cellular network 100.

A resource block (RB) is the smallest unit of resources that can be allocated to a user. The RB is 180 kHz wide in frequency and 1 slot long in time. A Physical Resource Block (PRB) is defined as consisting of 12 consecutive subcarriers for one slot (0.5 ms). In the context of the present invention, the RB is alternatively referred to as PRB, and vice versa.

The proposed solution of the invention analyses achievable user experience in terms of data user throughput and provides information for a different part of sector (from close to antenna to cell edge). The invention is built on analysis that decouples user experience in terms of data service throughput to two components, i.e number of PRBs available per user, and throughput per PRB. The first component i.e number of PRBs available per user is mainly driven by served traffic in a cell and deployed capacity, and estimation of number of physical resource (RB) blocks available to newcomer in the observed cell. It will depend mainly on deployed bandwidth and average number of active users in the scheduler, but also on control channel configuration or resource consumption from other services like Voice over Long-term Evolution (VoLte).

The monitoring module 202 determines RBs available per user for a given frequency layer based on available PRB resources for that frequency layer and Active UE potential. The available PRB resources for the given frequency layer is determined based on Physical Download Control Channel (PDCCH) configuration of the cellular network 100, deployed bandwidth (BW), and information about PRBs consumed by other services like VoLte or IoT. The PDCCH configuration may be extracted from Performance Management data in the system, and the information about PRBs consumed by VoLte may be extracted from Configuration Management data.

In a multi-layer carrier aggregation scenario, where multiple frequency layers are present in a single cell sector, the active UE potential is the sum of measured number of active UEs in different frequency layers of the same cell sector, to better model active UEs that are applying for same pool of resources, although being registered in another cell/layer of the same cell sector. The monitoring module 202 obtains a number of PRBs available for a new user in the selected cell sector by dividing total number of PRBs resources by Active UE potential increased by 1. For the selected cell sector, the monitoring module 202 generates a plurality of PRBs available per user for corresponding plurality of frequencies F1, F2 and F3.

The system 200 further includes a network monitoring module 204 for estimating data throughput per PRB in the cell sector at the given frequency, wherein data throughput per PRB in the cell sector includes a plurality of throughput per PRB values across a plurality of parts of the cell sector respectively. The network monitoring module 204 may estimate throughput per PRB for different parts of the selected cell sector based on radio quality and link adaptation measurements per sector, and traffic increase. The radio quality and link adaptation measurements per sector may include Channel Quality Indicator (CQI) distribution, Multiple Input Multiple Output (MIMO) utilization and modulation distribution.

The network monitoring module 206 estimates the second component, i.e., throughput per PRB which is mainly the measure of spectral efficiency in the system, which is driven by Radio Frequency (RF) design, way that system handles interference through different features and algorithms, Multiple Input Multiple Output (MIMO) utilization and Link adaptation efficiency and well as traffic mix and network load. It may be estimated for different parts of the observed cell through analysis of probability density function of reported Channel Quality Indicator (CQI) distribution in the cell.

Throughput per physical resource block and link adaptation in initial solution phase may be modelled as $3^{rd}$ Generation Partnership Project (3GPP) recommendations. With implemented Artificial Intelligence/Machine learning AI/ML techniques applied and analysis conducted on data collected from various commercial networks, the model is adjusted to mimic better performance of schedulers from different Radio Access Network (RAN) vendors, by comparing expected (3GPP recommended link adaptation) and measured from the field/live networks: modulation usage, MIMO utilization, MCS selection and TBS decision, and achieved spectral efficiency.

More particularly, the network monitoring module 206 estimates the throughput per PRB for different parts of the selected cell sector for current network load and predicted future network load, where prediction is based on estimation of CQI and MIMO utilization degradation with traffic and network load growth, with combination of supervised and unsupervised learning on data sets collected from past. Particularly, the modelling of degradation of performance with traffic load growth may be done by modelling anticipated interference increase and CQI degradation, as well as related reduction of MIMO utilization. The supervised and unsupervised learning on data sets collected from observed network may be combined, with focus on correlation of two relevant metric versus network load measured as Physical Resource Block (PRB) utilization. The measurements may be collected with hourly resolution, to capture performance for different network load situation. In prediction process, data may be segmented for parts of the network with different site density, calculated as number of neighboring sites deployed within certain radius, then for working and weekend days, to better capture impacts of mobility, and per heavy traffic factor, calculated per cell as ratio between overall data payload and PRB utilization. The final outcome is function of CQI and MIMO degradation of relative traffic/load growth. Growth factors may be applied to number of active User Equipment (UEs) in the scheduler or Active UE Potential for carrier aggregation scenario. Throughput per RB as main metric/function may change with traffic increase in the network.

Figures 3, 4:
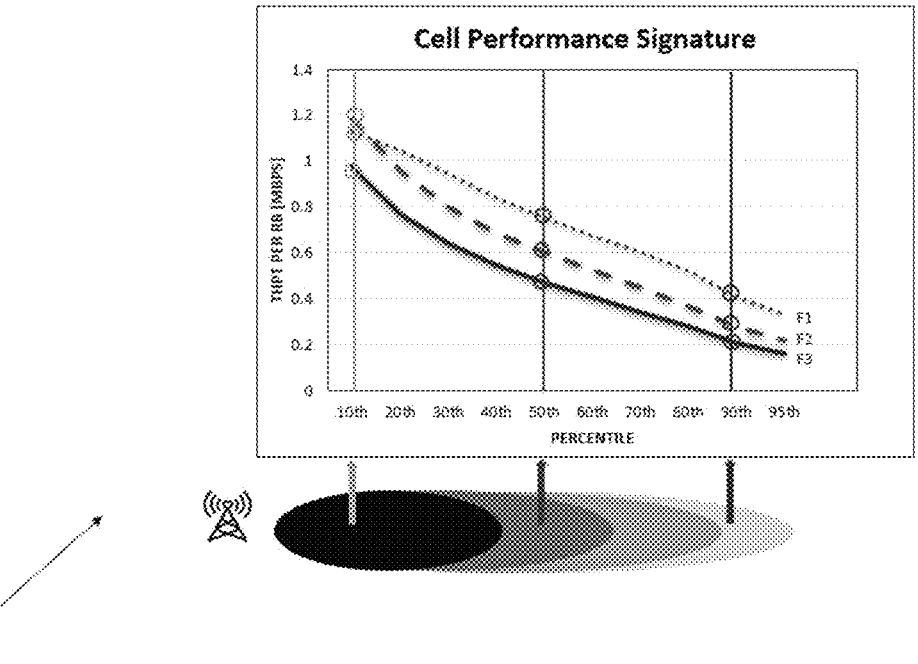
FIG. 3 illustrates a percentile graph of throughput per RB values calculated across different parts of the cell sector.
FIG. 4 illustrates an overall user throughput in the cell sector calculated across different parts of the cell sector for different frequencies.

For the selected cell sector and a given frequency layer, the network monitoring module 206 generates throughput per PRB across different parts of the selected cell sector. FIG. 3 illustrates a percentile graph 300 plotting throughput per PRB (in MBPS) for different frequencies F1, F2 and F3 across their percentile values. For the selected cell sector, and the given frequency layer, different values of throughput per PRB are estimated across different parts of the cell. In an example, 10 values of throughput per PRB may be estimated at different parts of the cell such as at the base station, a little far from the base station, further away from the base station, and so on. Once the throughput per PRB values is obtained for different parts of the selected cell, they can be grouped and plotted according to their percentile values.

It can be seen that $10^{th}$ percentile of throughput per PRB values have highest values, and they may be assumed to be estimated nearest to corresponding base station. Further, $50^{th}$ percentile of throughput per PRB values have moderate values and they may be assumed to be estimated a little far from corresponding base station, and $95^{th}$ percentile of throughput per PRB values have least values and may be assumed to be estimated very far from corresponding base station. Referring back to FIG. 2, the system 200 further includes a computing module 206 for computing user throughput of the selected cell sector based on the number of available PRBs in the selected cell sector for multiple frequencies, and data throughput per PRB for multiple frequencies.

The computing module 206 computes an overall user throughput Lit using the following equation:

$$U_t = \sum_{i=1}^{n} (\#RB \text{ available} - Fi) * Thpt \text{ per } RB(Fi, \text{percentile})$$

Where,
RB available–Fi=RB available per user for frequency Fi
Thpt per RB (Fi, percentile)=Throughput per RB for frequency H and a given percentile.

Thus, for a given percentile of throughput per PRB, the computing module 206 first calculates a first product of RB available per user and throughput per PRB for first frequency, a second product of RB available per user and through put per PRB for second frequency, and so on till nth frequency. The computing module 206 then determine a sum of the first, second . . . nth products to determine the overall user throughput for the given percentile value. In the similar manner, the computing module 206 determines the overall user throughput for various percentile values.

The system 200 further includes a graphic illustration module 208 for creating a graphical illustration of the overall user throughput computed by the computing module 206. FIG. 4 is a graph 400 illustrating the overall user throughput (in MBPS) across various percentiles, indicative of user throughput across different parts of the selected cell sector. It can be seen clearly from the graph 400 that the overall user throughput is maximum nearest to corresponding base station in the cell sector.

Also, the user throughput may be estimated for different parts of the cell sector for current network load and predicted future network load, with current and future deployed capacity. In this manner, the user throughput may be helpful in performing segmentation of cells/cell sectors that does not meet a predefined target for certain traffic growth, which may further facilitate in making capacity expansion decisions based on predicted user experience for different scenarios. Similarly, data from various commercial networks may be analysed and AI based techniques may be used to create models which can be adjusted to mimic better performance of schedulers from different network vendors by comparing expected and actual values of relevant parameters.

Figure 5:
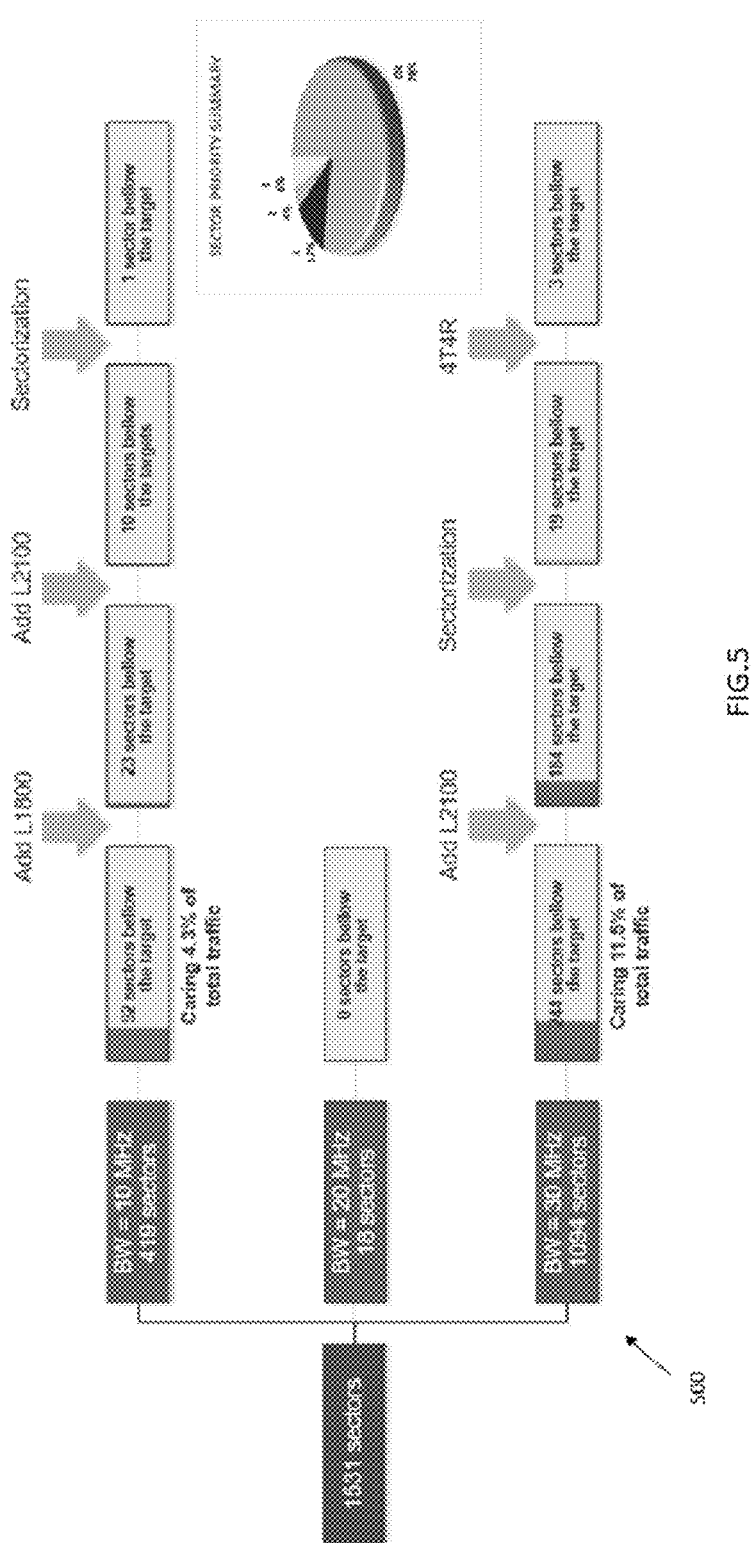
FIG. 5 illustrates an example decision tree determined based on the user throughput in a plurality of cell sectors of the cellular network.

FIG. 5 illustrates an example of expansion decision tree 500 formed based on the overall user throughput calculated by the system 200 for the plurality of cell sectors of the cellular network, in accordance with an embodiment of the present invention. The decision tree 500 facilitates in making decisions, such as where to invest, how much capacity, and what-if analysis. The decision tree 500 shows decision making and analysis process for 1531 sectors. These sectors are further categorized based on the frequency bands, and then it is determined that which sectors have met the target. In addition, what-if calculation for adding additional frequency layers that are not present are done, to estimate performance in case of additional capacity deployment, for different scenarios. Throughput per RB in such cases is estimated as average for cells with that operating frequency in the network. All user throughput calculations are conducted for different part of the cell, as per throughput per RB calculation are done. The methodology supports estimation of performance when new frequency layers are added and also taking into consideration of typical throughput per RB for added frequency for geographical area of interest.

Figure 6:
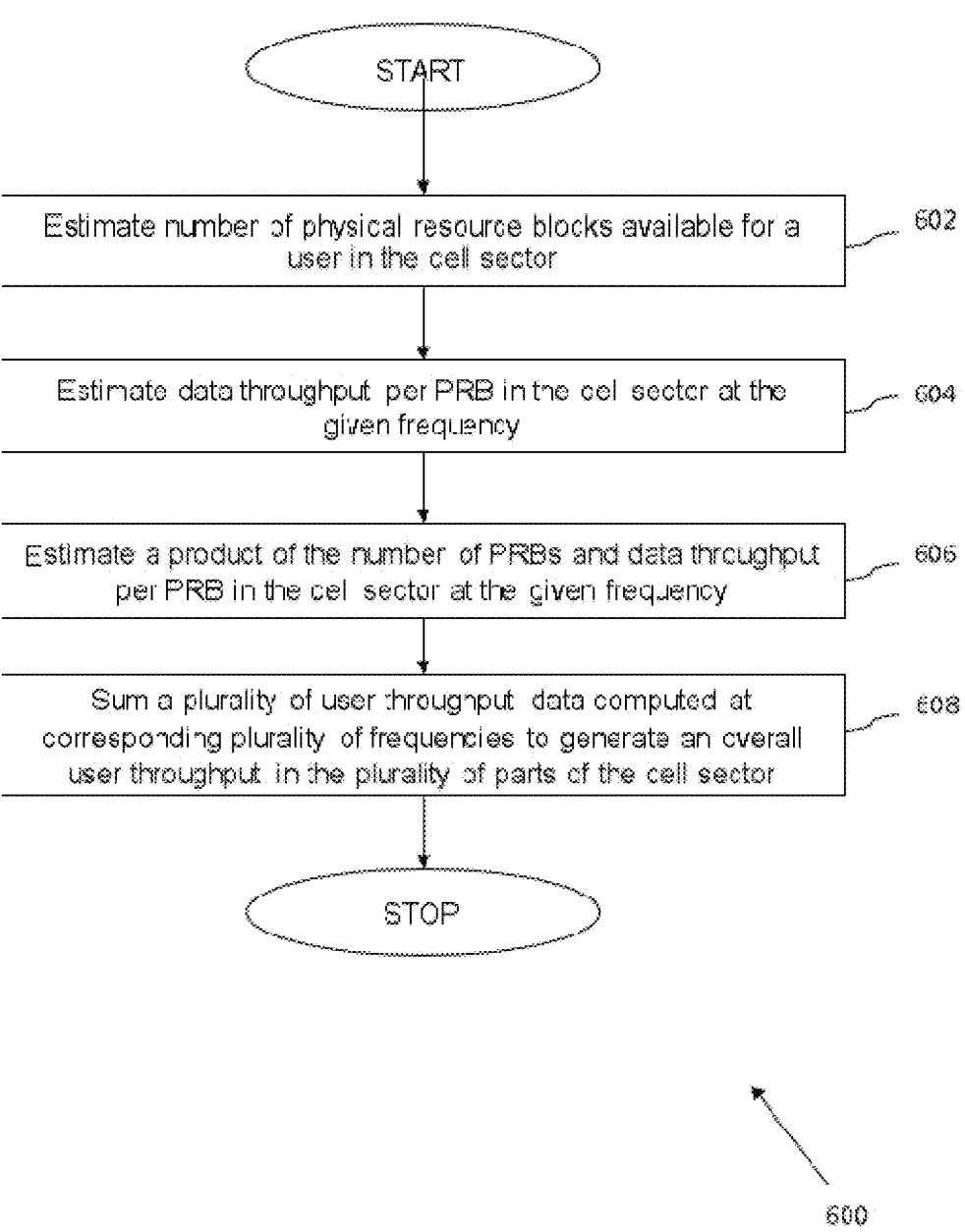
FIG. 6 is a flowchart illustrating a method for determining user throughput in the cell sector, in accordance with an embodiment of the present invention.

FIG. 6 is a flowchart illustrating a method 600 for determining user throughput in a cell sector.

At step 602, the method 600 includes, estimating the number of physical resource blocks (PRB) available for a new user per cell. In an embodiment of the present invention, the number of physical resource blocks (PRBs) available for a user in the cell sector are estimated at a given frequency. The estimated number of overall physical resource blocks available depends on parameters such as deployed bandwidth, average number of active PRBs and the Physical Download Control Channel (PDCCH) configuration of the network, that can be extracted from Configuration Management data, and information about PRBs consumed by other services like VoLte or IoT, that can be extracted from Performance Management data in the system.

At step 604, the method includes further estimating the data throughput per PRB in the cell sector at the given frequency. The data throughput per PRB in the cell sector includes a plurality of PRB values across a plurality of parts of the cell sector respectively. The estimated throughput per PRB is a measure of the spectral efficiency of the system which is driven by a plurality of parameters such as Channel Quality Indicator (CQI), Multiple Input Multiple Output (MIMO) utilization, traffic mix and network load. Data throughput is estimated for different parts of each selected cell through analysis of probability distribution function of reported CQI distribution in each cell. The invention models CQI and MIMO utilization change in a growing traffic and network load, which are extremely relevant to predict properly system performance. Estimation of user throughput per RB are done for different percentiles, as per distribution of CQIs, to capture performance of the system in different parts of the cell.

At step 606, the method includes estimating a product of the number of PRBs and data throughput per PRB in the cell sector at the given frequency, to generate user throughput data at the given frequency in the plurality of parts of the cell sector. Thereafter, at step 608, the method includes summing a plurality of user throughput data computed at corresponding plurality of frequencies to generate an overall user throughput in the plurality of parts of the cell sector.

Similarly, data from various commercial networks is analysed and AI based techniques are used to create models which can be adjusted to mimic better performance of schedulers from different network vendors by comparing expected and actual values of relevant parameters. Specifics of a particular mobile network and potential impact on its performance by parameters such as traffic mix (heavy vs. light traffic), quality of RF design, distribution of users in space, multipath propagation and impact of load increase on ability for spatial multiplexing etc. would be captured in AI based model tuning, with goal to mimic better network performance evolution. This will be achieved through combination of supervised and unsupervised learning on data sets collected from different commercial mobile networks deployed with different RAN vendors.

Further, cost functions may be created, based on Performance Indicators (PI) that can be collected through Performance Measurement (PM) systems provided by RAN vendors. Parameters of function of mapping reported CQI to estimated throughput per RB may lead to improved accuracy of model for throughput per RB estimation.

Although the present invention has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present invention as defined.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method for determining user throughput in a cell sector of a cellular network, the method comprising the steps of:

estimating a number of physical resource blocks (PRBs) available for a user in the cell sector at a given frequency;

estimating data throughput per PRB in the cell sector at the given frequency, wherein data throughput per PRB in the cell sector includes a plurality of PRB values across a plurality of parts of the cell sector respectively;

estimating a product of the number of PRBs and data throughput per PRB in the cell sector at the given frequency, to generate user throughput data at the given frequency in the plurality of parts of the cell sector, wherein the number of PRBs available for the user is estimated based on available PRB sources at the given frequency and a number of active users in the cell sector, wherein the number of active users includes a sum of measured number of active users in one or more frequency layers of the cell sector, and wherein the available PRB resources at the given frequency are determined based on a deployed bandwidth, and Physical Download Control Channel (PDCCH) configuration of the cellular network, and information about PRBs consumed by Voice over LTE (VoLte)s and Internet of things (IoT); and summing a plurality of user throughput data computed at corresponding plurality of frequencies to generate an overall user throughput in the plurality of parts of the cell sector.

2. The method as claimed in claim 1, further comprising creating a graphical illustration of the overall user throughput in the cell sector to indicate user experience in different parts of the cell sector.

3. The method as claimed in claim 1, wherein the data throughput per PRB in the cell sector is estimated based on radio quality and link adaptation measurements per cell sector, and expected traffic increase.

4. The method as claimed in claim 3, wherein the radio quality and link adaptation measurements are determined based on Channel Quality Indicator (CQI) distribution, and Multiple Input Multiple Output (MIMO) utilization and modulation distribution in the cell sector.

5. The method as claimed in claim 1, wherein the cellular network is a Long-Term Evolution (LTE) network or 5G-NR network.

6. The method as claimed in claim 1, wherein data throughput per PRB is estimated in different parts of the cell sector at the given frequency for current network load and predicted future network load, where prediction is based on estimation of CQI and MIMO utilization degradation with traffic and network load growth, with combination of supervised and unsupervised learning on data sets collected from past.

7. The method as claimed in claim 6, wherein the plurality of PRB values across the plurality of parts of the cell sector is estimated through analysis of probability distribution function of reported CQI distribution in the cell sector.

8. The method as claimed in claim 7, wherein the plurality of parts of the cell sector includes a base station of the cell sector, an edge of the cell sector, a mid-point between the base station and the edge.

9. The method as claimed in claim 1, wherein the number of PRBs available for the user is estimated by dividing an available number of PRBs by a number of active users increased by one.

10. The method as claimed in claim 1, further comprising grouping the plurality of throughput per PRB values based on a set of percentile values, and generating a graph of the plurality of throughput per PRB values against the set of percentile values, wherein the throughput per PRB values with minimum percentile value are estimated nearest to a base station of the cell sector, and the throughput per PRB values with maximum percentile value are estimated farthest from the base station of the cell sector.

11. A system for determining user throughput in a cell sector of a cellular network, the system comprising:

a monitoring module for estimating a number of physical resource blocks (PRBs) available for a user in the cell sector at a given frequency;

a network monitoring module for estimating data throughput per PRB in the cell sector at the given frequency, wherein data throughput per PRB in the cell sector includes a plurality of PRB values across a plurality of parts of the cell sector respectively; and a computing module for estimating a product of the number of PRBs and data throughput per PRB in the cell sector at the given frequency, to generate user throughput data at the given frequency in the plurality of parts of the cell sector, and summing a plurality of user throughput data computed at corresponding plurality of frequencies to generate an overall user throughput in the plurality of parts of the cell sector, wherein the number of PRBs available for the user is estimated based on available PRB sources at the given frequency and a number of active users in the cell sector, wherein the number of active users includes a sum of measured number of active users in one or more frequency layers of the cell sector, and wherein the available PRB resources at the given frequency are determined based on a deployed bandwidth, and Physical Download Control Channel (PDCCH) configuration of the cellular network, and information about PRBs consumed by Voice over LTE (Volte) s and Internet of things (IoT).

12. The system as claimed in claim 11, further comprising a graphic illustration module for creating a graphical illustration of the overall user throughput in the cell sector to indicate user experience in different parts of the cell sector.

13. The system as claimed in claim 11, wherein the data throughput per PRB in the cell sector is estimated based on radio quality and link adaptation measurements per cell sector and expected traffic increase.

14. The system as claimed in claim 13, wherein the radio quality and link adaptation measurements include Channel Quality Indicator (CQI) distribution, and Multiple Input Multiple Output (MIMO) utilization and modulation distribution in the cell sector.

15. The system as claimed in claim 11, wherein data throughput per PRB is estimated in different parts of the cell sector at the given frequency for current network load and predicted future network load, where prediction is based on estimation of CQI and MIMO utilization degradation with traffic and network load growth, with combination of supervised and unsupervised learning on data sets collected from past.

16. A non-transitory computer readable medium having stored thereon computer-executable instructions which, when executed by a processor, cause the processor to:

estimate a number of physical resource blocks (PRBs) available for a user in a cell sector of a cellular network at a given frequency;

estimate data throughput per PRB in the cell sector at the given frequency, wherein data throughput per PRB in the cell sector includes a plurality of PRB values across a plurality of parts of the cell sector respectively;

estimate a product of the number of PRBs and data throughput per PRB in the cell sector at the given frequency, to generate user throughput data at the given frequency in the plurality of parts of the cell sector, wherein the number of PRBs available for the user is estimated based on available PRB sources at the given frequency and a number of active users in the cell sector, wherein the number of active users includes a sum of measured number of active users in one or more frequency layers of the cell sector, and wherein the available PRB resources at the given frequency are determined based on a deployed bandwidth, and Physical Download Control Channel (PDCCH) configuration of the cellular network, and information about PRBs consumed by Voice over LTE (Volte) s and Internet of things (IoT); and sum a plurality of user throughput data computed at corresponding plurality of frequencies to generate an overall user throughput in the plurality of parts of the cell sector.

* * * * *